No. 897,338. PATENTED SEPT. 1, 1908.
C. E. BATHRICK.
AUTOMATIC WATER SUPPLY TANK.
APPLICATION FILED JUNE 19, 1905.
3 SHEETS—SHEET 1.
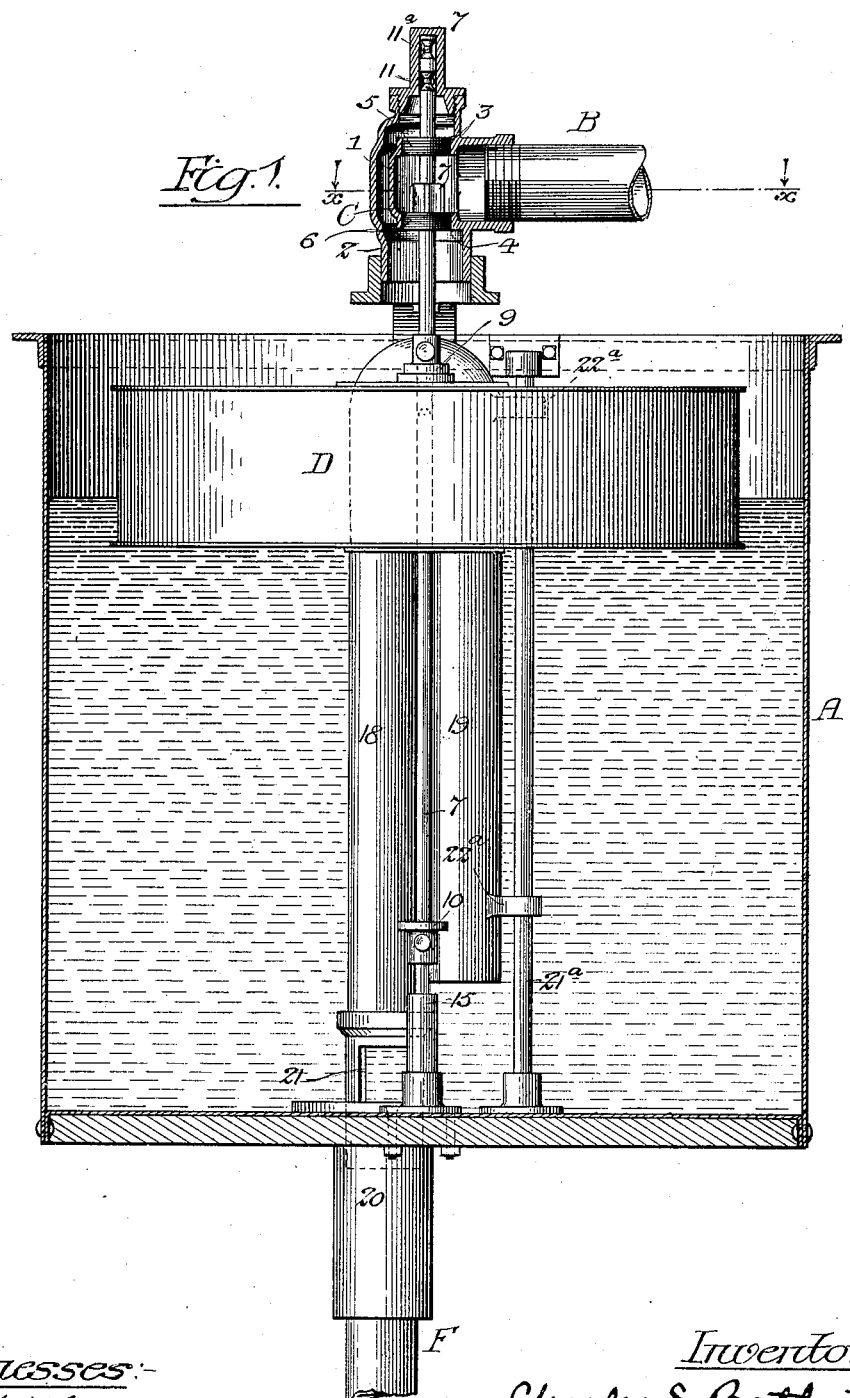

No. 897,338.  
PATENTED SEPT. 1, 1908.  
C. E. BATHRICK.  
AUTOMATIC WATER SUPPLY TANK.  
APPLICATION FILED JUNE 19, 1905.  
3 SHEETS—SHEET 2.

Witnesses:—
Louis M. F. Whitehead
O. C. Freiberg

Inventor:—
Charles E. Bathrick
By:— Chas. G. Page
Atty.

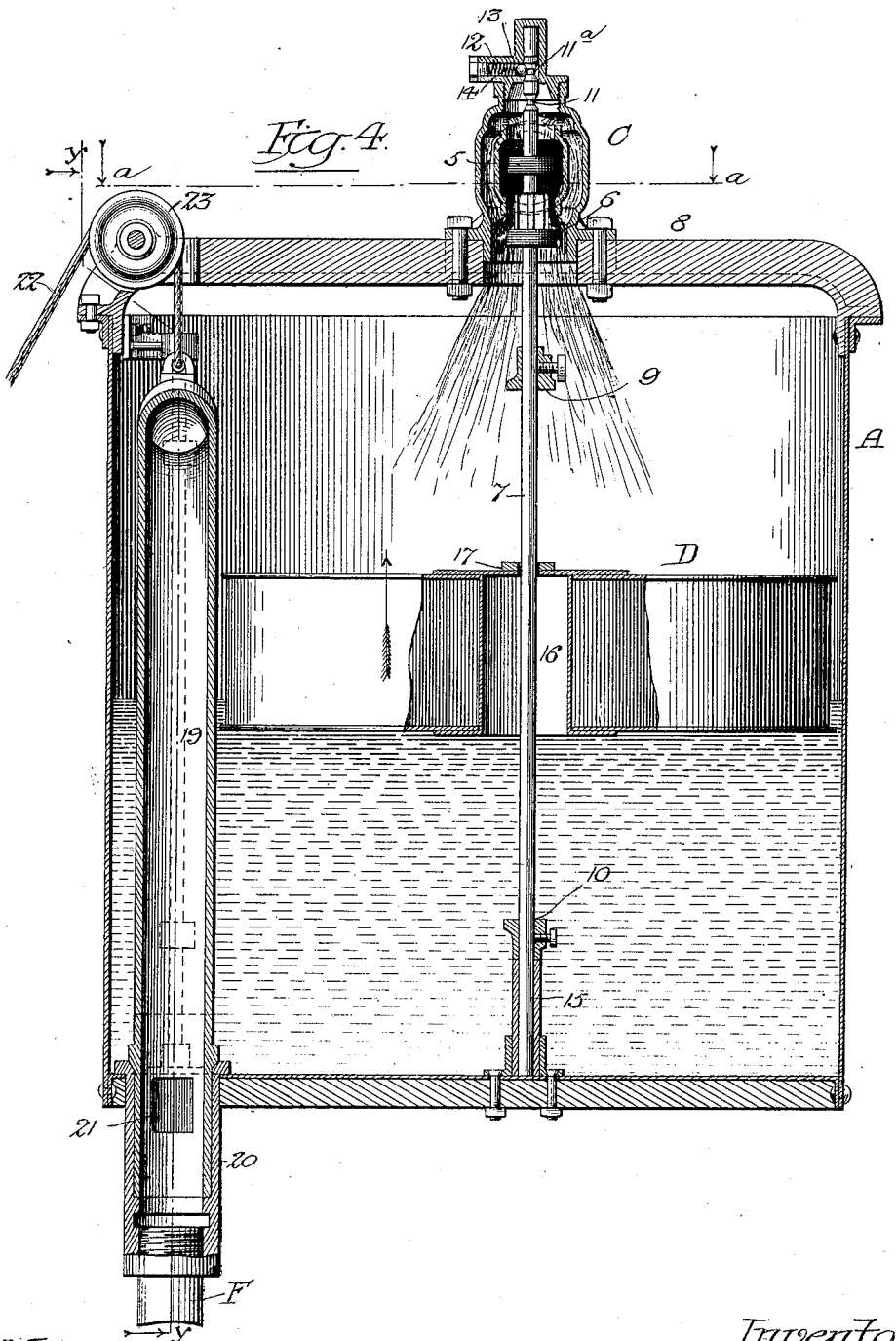

UNITED STATES PATENT OFFICE.

CHARLES E. BATHRICK, OF CHICAGO, ILLINOIS, ASSIGNOR TO FREDERICK C. AUSTIN, OF CHICAGO, ILLINOIS.

AUTOMATIC WATER-SUPPLY TANK.

No. 897,338.  Specification of Letters Patent.  Patented Sept. 1, 1908.

Application filed June 19, 1905. Serial No. 265,922.

*To all whom it may concern:*

Be it known that I, CHARLES E. BATHRICK, a citizen of the United States, residing at Chicago, in the county of Cook and State of Illinois, have invented certain new and useful Improvements in Automatic Water-Supply Tanks, of which the following is a specification.

My invention is particularly adapted for supplying a quantity of water to a concrete mixer or to materials to be used for making concrete.

Objects of my invention are to automatically establish the flow of water into the tank and to cut off such inflow as soon as the tank has been supplied with a predetermined quantity of water, and to siphon off such contents of the tank while the supply is closed, and to automatically establish the supply after or substantially after the contents of the tank has been thus drawn off, whereby for each batch of concrete a predetermined quantity of water can be supplied.

Figure 3:
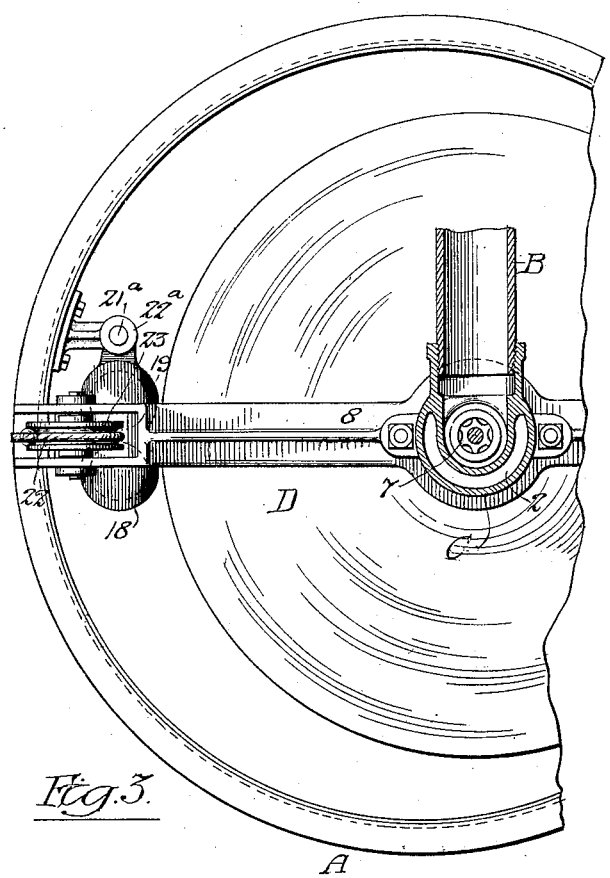
Figure 2:
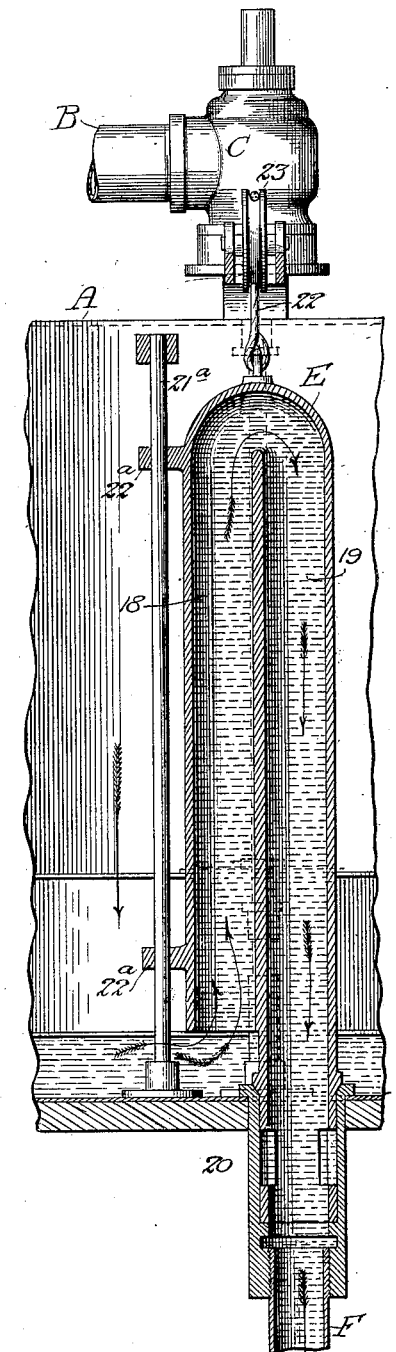

In the accompanying drawings: Figure 1, represents my improved automatic water supply tank partly in vertical central section and partly in side elevation, the valves being closed so as to cut-off the inflow of water, and the float being in a raised position. Fig. 2, is a detail illustrating mainly in vertical section on line $y$—$y$ in Fig. 4 the siphon device and a portion of the tank. Fig. 3, is a section on line $a$, $a$, in Fig. 4, a portion of the tank being broken away for convenience of illustration. Fig. 4, is a section taken on a vertical plane centrally through the tank and siphon.

The tank or receptacle A is adapted to receive and contain a suitable quantity of water.

B indicates a portion of the supply pipe, it being understood that this pipe may connect with any suitable source of supply. The pipe B connects with and opens into a chamber 1, formed within a casing C, the chamber 1 being ported and valved whereby communication between the chamber 1 and the surrounding space or chamber within the shell or casing C can be established and cut off in alternation.

In the construction illustrated, the chamber 1 occupies only a portion of the space or chamber formed by the shell or casing C, the said chamber 1 being provided with an upper port at 3, and a lower port at 4, each arranged to open into the space or chamber between the chamber 1 and the outer casing C. The ports 3 and 4 are opened and closed by valves 5 and 6, arranged upon a common valve stem 7, as illustrated in Figs. 1 and 4. The space or chamber 2 of the casing forms a passage which is open at its lower end and arranged over the open top of the supply tank, the casing C being for such purpose secured upon a support 8, which is secured upon the upper portion of the supply tank.

The valve stem or rod 7, extends downwardly to the bottom of the tank and is provided at points below its valves with stops 9 and 10, which are adjustable in position along the stem 7. The tank also contains a float D and a siphon E, the float being provided as a means for arresting the supply of water to the tank at a proper moment, and the siphon being provided as a means for emptying the tank. The valve stem 7 passes centrally through the float which latter is fitted to slide along the valve stem.

When the valves are open as in Fig. 4, water from the supply pipe B will flow into chamber 1, thence into the chamber or passage 2 around said inner chamber, and thence into the tank as illustrated in Fig. 4 in which the float has been raised by the water in the tank to some extent. When the body of water in the tank is of sufficient quantity, it will have raised the float to an extent to cause the float to engage the upper stop 9 on the valve stem and to lift such stem until the valves 5 and 6 are closed, thereby cutting off the further flow of supply water. At said juncture the valve rod is automatically engaged and held up by a light catch or spring device, as for example, the valve stem has an annular groove 11, formed with beveled side-walls, and the casing C is provided at its upper portion with a way 12, a ball 13 and a spring 14, arranged to normally force said ball toward and against the valve stem, whereby, when the valve stem reaches the position shown in Fig. 1, the spring 14 will force the ball partially out of the inner end of the way 12 and cause the inwardly projecting portion of said ball to engage in groove 11 of the valve stem. It will therefore be seen that by this arrangement, the valve stem is locked in its upper position when the valves are raised sufficiently to close ports 3 and 4, and that by thus locking the valve stem in such upper position the valves will remain closed, while at the same time the float D may descend as the water is being drawn off from the tank. When, however, the float D approaches the desired limit of its downward movement, it will engage the lower stop 10 on the valve stem and by reason of its weight draw down the valve stem, causing the latter to force back the locking ball 13.

When the valve stem reaches the end of its down movement, it is again temporarily locked by the spring backed ball 13, which at said juncture engages a beveled groove 11$^a$ formed in the valve stem at a point above the groove 11 therein, as illustrated in Fig. 4. When the valve stem is thus drawn down by the float to the position shown in Fig. 4, the valves 5 and 6 are of course opened and flow of water from the pipe B thereby established. The stops 9 and 10 can be adjusted with reference to the times for opening and closing the valve device, the inflow of water into the tank can be properly regulated.

The lower end portion of the valve stem is fitted to slide up-and-down in a guide-socket 15, and in order to permit the float to descend to a suitable extent, it is preferably formed as an annular chamber around a central inner tubular wall 16, open at its lower end and provided at its top end with a plate or cap 17, which slides upon the valve-stem and which engages stop 10 during the downward movement of the float.

The siphon E has its short arm or leg 18 entirely within the tank. The major portion of the longer arm or leg 19 of the siphon is also within the tank, but the lower end portion of such longer leg of the siphon extends downwardly through an opening in the bottom of the tank, as for example, the discharge pipe F is connected with the bottom of the tank by a coupling 20 and the lower end portion of the siphon leg 19 is fitted to slide up-and-down within said coupling 20. The longer leg portion 19 of the siphon is also provided with a lateral port 21, which is below the body of water and closed by the coupling 20 when the siphon is at its lowest limit as in Fig. 4, but when the siphon is raised as in Fig. 1, said port 21 then opens into the body of water within the tank. The siphon is suitably arranged for up-and-down movement, for example, a cable 22 is attached to the upper end of the siphon and carried over a pulley 23 upon support 8 over the tank, whereby an attendant can operate the cable 22 for the purpose of raising the siphon to an extent to permit its port 21 to open into the tank.

After the tank has been suitably filled, and the inflow of water has been automatically cut off by the float and valve device, as in Fig. 1, an attendant will draw upon the outer portion of cable 22, so as to raise the siphon to an extent to permit its side port 21 to open into the body of water within the tank. Thereupon, water will rush into the longer leg 19 of the siphon by way of its port 21, and the operator may then release the cable 22 and permit the siphon to again drop into the position shown in Fig. 4, so as to close the siphon port 21. The body of water thus admitted into the longer leg of the siphon will pass downwardly and within said siphon leg and thereupon external atmospheric pressure will cause water from the tank to enter and rise in the shorter leg of the siphon, and thence flow into and fill the longer leg thereof and permit the siphon to empty the tank.

The siphon E which can be raised by a cord or cable 22, is suitably guided during its up-and-down movement, as for example, it is guided by a stationary guide-rod 21$^a$, secured at its lower end upon the bottom of the tank and extending upwardly through guide eyes 22$^a$ on the siphon.

When the float has risen within the tank as in Fig. 1, the supply valve is closed and temporarily locked, and if the siphon is then drawn up as in Fig. 1 so as to expose its lateral port 21 within the tank, water will flow into such port until the siphon is allowed to drop, and upon thus dropping its lateral port will be closed as in Fig. 2, while the process of employing the contents of the tank through the siphon will then properly begin. As the water thus passes out the float will descend, but it will not strike the lower tappet 10 and thereby open the supply valve until all or substantially all of the contents of the tank has passed out through the siphon, or until the continuous flow through the siphon has been broken. Also to provide certain novel and improved details.

What I claim as my invention is:

1. The combination of the tank provided with a liquid supply port; a supply valve arranged for opening and closing the supply port and secured upon the upper portion of a stem extending from the valve downwardly within the tank and having two spaced and relatively adjustable tappets; spring locking means for automatically locking the valve in its open and closed positions in alternation; a float for operating the valve and for releasing it from each of its said two locked positions, the float being to such end arranged to engage the upper tappet and lift the stem and valve during its rise within the tank, and to engage the lower tappet and draw down the stem and valve during its descent within the tank, said float being sufficiently buoyant to release the valve and stem from the spring locking means during its rise, and being of sufficient weight to release the valve and stem from the spring locking means during its descent; and a siphon for drawing off the liquid contents of the tank while the supply port is closed by the valve.

2. The combination of the tank provided with a liquid supply port; a valve arranged for opening and closing the supply port and having a stem whereon the valve is secured extending downwardly within the tank and provided with relatively spaced and adjustable tappets 9 and 10; spring locking means for automatically locking the valve stem in position to hold the valve closed and open in alternation; a float arranged for up and down movement along the stem and for unlocking and operating the said stem; and a device for drawing off liquid from the tank consisting of a siphon supported for vertical movement and having a lateral inlet port above the lower end of its longer leg, and means for raising the siphon to expose its said lateral port within the tank when the latter is suitably filled and the supply valve is locked, and for lowering the siphon to an extent to close its said port and permit a predetermined quantity of the liquid contents of the tank to be siphoned off from the tank before the supply valve is unlocked by the descending float.

3. The combination with the tank, of means for controlling the supply to the tank consisting of a valve chamber having opposite outlet ports and an intermediate inlet; a suitable passageway for receiving liquid from both of said ports and for discharging the same into the tank; and a pair of valves secured upon the upper end portion of an upright longitudinally movable stem, the valves being relatively spaced and arranged for simultaneously closing the said ports, and the stem being extended downwardly within the tank and provided with a pair of tappets; spring locking means for locking the pair of valves in open and closed positions; a float for engaging the tappets in alternation and unlocking and operating the stem, and a siphon for drawing off the liquid contents of the tank while the supply port is closed.

4. The combination with the tank of a float arranged within the tank and having a central opening, a valve stem extending through the opening in the float which latter has a sliding connection with the stem, said stem being provided with stops or tappets respectively above and below the float; a shell or casing C mounted upon the tank and connected with liquid supply means; a shell 1 arranged within the casing C and having open upper and lower ends and also having lateral communication with the supply pipe or passage; and valves 5 and 6 for closing the upper and lower open ends of the central shell 1, the valve stem above the valves being provided with two beveled grooves or notches 11 and 11$^a$, and the casing C being provided with a spring backed latch device for engaging in one or the other of the grooves or notches 11 and 11$^a$ according to the position of the valve stem.

5. The combination with the tank open at the top, of a water means having a discharge outlet arranged over the tank opening; a valve rod having means for controlling the discharge of liquid into the tank; a float arranged for independent up and down movement along the valve rod, the latter being provided with stops respectively above and below the float, for the purpose set forth; a siphon device E arranged within the tank alongside the float and having a ported ledge 19 extended below the bottom level of the tank; a guide device for guiding the siphon in its up and down movement; and a cable for raising and lowering the siphon attached to the latter and passing over a sheave on the tank.

CHARLES E. BATHRICK.

Witnesses:
E. E. FULMER,
D. P. CARPENTER.